Patented July 4, 1944

2,352,625

UNITED STATES PATENT OFFICE 2,352,625

METHOD OF REFINING LEAD

Paul Gottlieb Julius Gueterbock, Abbots Leigh, near Bristol, and Arthur Edward Baxter, Bristol, England, assignors to Capper Pass & Son Limited, Bristol, England No Drawing. Application February 26, 1941, Serial No. 380,740. In Great Britain March 28, 1940

4 Claims. (Cl. 204—116)

This invention relates to the electrolytic refining of lead and is particularly applicable to lead containing bismuth, gold and silver, so as to produce on the one hand a high grade soft lead free from impurities and on the other hand a residue rich in bismuth, gold and silver.

As hitherto practised, lead fluosilicate has been chiefly used as an electrolyte in the electrolytic refining of lead, and the object of the invention is to provide an improved method in which an electrolyte is employed which gives good deposits, is easy to regenerate and is stable, cheap and non-corrosive of steel and/or iron.

The method of refining lead according to the present invention consists in preliminarily fire-refining the base bullion by known methods so as to remove substantial quantities of copper, tin, antimony and arsenic present, electrolytically refining the purified lead so obtained, employing as the electrolyte an aqueous alkaline solution of a divalent lead compound, for example lead monoxide, glycerine or like solubility increasing agent not substantially affected by the electrolysis being added to the electrolyte to increase the solubility of the lead compound.

Other features of the invention are hereinafter fully described and claimed in the appended claims.

In the removal of bismuth from lead it is particularly desirable that the bismuth should be recovered in as highly concentrated a form as possible and not be associated with certain other substances which render its extraction and purification costly.

For this reason, in carrying out this invention, base bismuthic bullion is subjected to preliminary fire refining processes such as are well known per se to those conversant with the art, so as to remove copper, tin, antimony and arsenic as far as is economically possible; for example, the tin and arsenic may readily be reduced to a trace and the copper and antimony to less than .02%. It is not, however, necessary to remove these impurities to this extent but it may be advisable to do so, as in the course of subsequent electrolysis of the fire refined bullion these impurities remain entirely or in greater part with the bismuth, gold and silver and so tend to make the collective recovery of these metals and their isolation more costly. In part, tin, antimony and arsenic may be dissolved during electrolysis and removed from the electrolyte as explained below. The electrolyte is thus kept sufficiently free from substances which could be co-deposited with the lead at the voltage used, to ensure a pure lead cathode.

The fire refined base bullion is then subjected to electrolysis. For this purpose it is cast into plates of any suitable shape or thickness to serve as anodes.

The lead is deposited during electrolysis on cathodes consisting of pure lead or steel sheets of suitable size.

A feature of the invention consists in the employment as an electrolyte of an aqueous alkaline solution of a divalent lead compound of suitable strength, for example lead monoxide. Other lead compounds which may be employed are lead carbonate and lead sulphate.

The electrolyte may consist of an aqueous solution of caustic soda or potash, in which lead monoxide is dissolved and in preparing the same glycerine or like solubility increasing agent is added to increase the solubility of the lead oxide. Other polyhydric alcohols, such as ethylene glycol, may be employed instead of glycerine but glycerine has been found to give the best results.

It is also possible to increase the solubility of the lead compound by adding salts of tartaric and similar acids to the electrolyte and in this connection Rochelle salt may be mentioned as an example. It is desirable to include in the electrolyte a small quantity of an agent which is stable in the electrolyte and which will ensure that the lead deposited on the cathode shall be deposited in a dense coherent form. According to a further feature of the invention, saponin and/or alizarin are employed for this purpose. The former is to be preferred for the following reasons:

(1) The deposits remain dense even in the presence of chlorides, so that crude glycerine may be used for making up the electrolyte, with great saving of cost.

(2) The consumption of saponin per ton of lead deposited is negligible.

(3) Saponin is not deposited if the liquor cools below working temperature, while with alizarin and similar substances there is a tendency for lead "lakes" to be deposited. With alizarin this deposition also takes place slowly at working temperatures and causes a loss of alizarin.

The electrolytic vats may be made of steel and arranged in any convenient way provided steps are taken to ensure adequate circulation of the electrolyte to prevent stratification, which in all lead electrolytes takes place readily owing to the rapid increase of specific gravity with increasing lead content.

It is not desirable to cover the surface of the electrolyte in the depositing vats with any oil or grease to avoid absorption of carbon dioxide from the air by the caustic alkali. Traces of oil left on electrodes cause uneven deposition and corrosion. At the strengths of alkali and temperatures recommended absorption of carbon dioxide is slow. The process is not interfered with in the presence of such small quantities of carbonates, sulphates and chlorides as may be introduced from impurities in the ordinary grades of commercial substances used for making up the solution. In fact, the carbonate content of the electrolyte may be kept quite high.

According to a further feature of the invention during the circulation of the electrolyte a portion thereof is treated with lime in order to recausticise the electrolyte and precipitate any tin, antimony or arsenic present, the purified electrolyte being returned to circulation.

In effecting this purification, portions of the electrolyte should be led off from the main circulation, heated to 80° C. and stirred with hydrated lime. This recausticises the liquor and precipitates tin, antimony and arsenic compounds, thus maintaining the purity of the liquor. It is recommended that by this means the carbon dioxide content of the liquor should be kept round about or below 10 lb. per 100 gallons. The operation with good mixing takes about half an hour. The spent lime is easily filtered and washed.

The electrolyte may be operated at room temperature or may be heated and conveniently operated at temperatures up to about 55° C. as higher temperatures enable higher current densities to be employed.

In order to ensure pure deposits and to avoid passivation of the anodes, it is necessary to keep the voltage of each electrolytic cell low, say 0.2 to 0.5 volt. These conditions may be preserved by working at the appropriate current density, which will vary according—

(1) To the temperature used.
(2) To the percentage of impurities in the anode metal.
(3) As to whether a dropping slime is desired.
(4) If an adherent slime is desired, the intervals between removal of the slimes.
(5) The degree of concentration of bismuth, gold and silver desired in the slimes.

The lower the impurities in the anode metal and the higher the temperature, the greater the tendency to produce a dropping slime. The higher the current density the more lead remains in the slime.

It is evident that the process may be thus used in different ways to suit different conditions, but it is preferred to work with an adherent slime which is removed periodically, say every 24 or 48 hours, by passing the anodes through rotating or stationary brushes or scrapers of suitable design. By this method emptying the vats is avoided, the deposits are not contaminated by the highly concentrated slimes dropping and the very valuable slimes are easily collected. Rubber scrapers or scrubbers mounted on steel may be used for this purpose. A particular advantage of this electrolyte over the acid electrolyte hitherto normally used in lead electrolysis is that the design and construction of all plant is greatly facilitated, as steel and iron may be used without fear of corrosion.

The deposited lead may be melted in ordinary steel or cast iron kettles. The use of high temperature reverberatory furnaces is unnecessary as the lead is deposited in a very pure state and further fire refining from tin, antimony, etc., as required in the normal acid process, is not necessary.

In order to avoid oxidation during melting of the deposits additions of pitch or coal tar are used. Certain animal and vegetable fats or oils, as tallow and palm oil, can also be used but owing to the temperature at which lead melts these are liable to catch fire while pitch and tar may be used without risk, if a little care is taken. Pitch is recommended on account of price and ease of handling. The melted lead from the deposits is skimmed free from the small quantity of dross formed at a temperature of, say, about 380° C. It is then treated with a small quantity of sulphur or a sulphur-containing flux or a sulphur compound such as ammonium sulphate with sufficient pitch to cover, which treatment completely eliminates any traces of alkali metal it may still contain, when it is ready for casting into pigs in the usual way.

First example

The electrolyte used according to the invention was made by dissolving 102 lb. 98% caustic soda in, say, 80 gallons of water and adding and mixing therewith 125 lb. of 80% crude glycerine. A further addition of water was made to bring the bulk to 100 gallons and this liquor was percolated at 50° C. through a layer of powdered litharge about ½″–1″ thick until it contained about 30 lb. per 100 gallons of lead. ½ lb. saponin was then dissolved in 1 to 2 gallons of water and this concentrated saponin added slowly with continual mixing to the electrolyte. The final composition of the electrolyte thus made was approximately:

| | Lb. per 100 gallons |
|---|---|
| Caustic soda (free and combined) | 100 |
| Glycerine | 100 |
| Saponin | ½ |
| Lead | 30 |

The electrolyte was circulated through a cascade of cells so that the liquor in the cells was changed twice per hour and kept at a temperature of about 52° C. The cells were of steel, well lagged externally. The flow of the liquor was across the faces of the electrodes from bottom to top. The temperature and circulation were maintained by pumping the liquor through a steel calorifier.

Loss of water through evaporation took place at the rate of 4 gallons per 100 sq. ft. of exposed surface per hour. Carbonation took place at the rate of 0.4 lb. carbon dioxide absorbed per 100 sq. ft. of surface per hour. The liquor was treated periodically with commercial hydrated lime powder at 80° C. in a mixer. Lime was used in the proportion of 56 lb. to 400 gallons liquor. The spent lime was filtered and washed. It was normally about 80% carbonated and contained usually:

| | Per cent |
|---|---|
| Tin | 2 to 5 |
| Antimony | 1 to 3 |
| Arsenic | 0.1 to 0.3 |

The liquor, before treatment, held about 11 lb. carbon dioxide per 100 gallons and after treatment 1 lb. carbon dioxide per 100 gallons. Sufficient liquor was thus causticised so as to maintain the carbon dioxide content of the electrolyte round about 11 lb. per 100 gallons.

Base bullion had been fire refined by known methods till it contained:

| | Per cent |
|---|---|
| Gold and silver | 0.378 |
| Bismuth | 1.134 |
| Antimony | .100 |
| Tin | Trace |
| Copper | .060 |

This was cast into anodes 1" thick, in vertical moulds.

The cathodes consisted of pure sheet lead starting sheets.

The current during electrolysis was maintained at 6 amps. per square foot of immersed anode face as cast. The voltage per cell was about 0.2–0.25 volt.

The anodes were removed from the cells and slime removed every 48 hours by scraping with rubber squeegees under a stream of water. The anodes were then replaced till corroded to about ⅛ inch thickness. This took about 15 days. At the ends of this period the deposits were removed and the spent anodes cleaned and recast with fresh metal into new anodes.

The cathode deposits which were dense and coherent were washed by immersion in water, allowed to drain and then melted up slowly with about 1% pitch, skimmed from dross, and the molten metal re-covered with pitch with the addition of 1 lb. ammonium sulphate, per ton of lead. After standing two hours the lead was dipped—about 98% of the cathode weight being dipped as pig lead.

The slimes were filtered and washed. The filter cake held about 20% moisture and 80% metallic content which assayed:

| | Per cent |
|---|---|
| Silver and gold | 18.6 |
| Bismuth | 57.3 |
| Copper | 3.0 |
| Antimony | 3.0 |
| Lead | 16.0 |

The refined lead assayed:

| | Per cent |
|---|---|
| Gold and silver | Less than 0.0004 |
| Bismuth | 0.019 |
| Antimony | 0.003 |
| Arsenic | 0.0003 |
| Copper | 0.0008 |

It was soft and of a readily merchantable quality.

*Three other examples (2, 3 and 4).*—Using the same electrolyte and the same procedure except where stated, base bullions of the following compositions were electrolysed:

| | 2 | 3 | 4 |
|---|---|---|---|
| | Per cent | Per cent | Per cent |
| Gold and silver | 0.385 | 0.35 | 0.121 |
| Bismuth | 1.094 | 0.87 | 0.31 |
| Copper | 0.015 | 0.058 | 0.028 |

The current densities used were:

| 2 | 3 | 4 |
|---|---|---|
| Amps./sq. ft. 7.5 | Amps./sq. ft. 6.5 | Amps./sq. ft. 7.5 |

The temperatures of electrolyte used were:

| 2 | 3 | 4 |
|---|---|---|
| °C. 55 | °C. 32 | °C. 32 |

The intervals between successive de-slimings were:

| 2 | 3 | 4 |
|---|---|---|
| Hours 48 | Hours 24 | Hours 24 |

The approximate voltages per cell being:

| 2 | 3 | 4 |
|---|---|---|
| Volts .25 | Volts .35 | Volts .4 |

The refined leads assayed:

| | 2 | 3 | 4 |
|---|---|---|---|
| | Per cent | Per cent | Per cent |
| Gold and silver | 0.0004 | 0.0007 | 0.0005 |
| Bismuth | 0.013 | 0.009 | 0.007 |
| Antimony | 0.003 | 0.0025 | 0.002 |
| Arsenic | 0.0003 | 0.0005 | 0.00025 |
| Copper | 0.0008 | 0.0008 | 0.0004 |

They were all soft and of readily merchantable quality.

*Slimes*

The metallic contents of the slimes assayed:

| | 2 | 3 | 4 |
|---|---|---|---|
| | Per cent | Per cent | Per cent |
| Gold and silver | 22.5 | 23.8 | 18.7 |
| Bismuth | 62.5 | 60.7 | 59.1 |
| Copper | 0.8 | 5.3 | 6.2 |
| Lead | 12.0 | 8.1 | 14.5 |

It is to be noted that the lead obtained by the present method does not require any further fire refining and the metallic slimes obtained are easily treated for the recovery of bismuth, gold and silver.

We claim:

1. In the refining of lead which has been previously purified by the substantial elimination of copper, tin, antimony and arsenic, the process which comprises forming anodes of said lead and passing an electric current from said anodes to cathodes through an electrolytic bath comprising essentially an aqueous alkaline solution of a divalent lead compound and a polyhydric alcohol, selected from a class consisting of glycerine and ethylene glycol, sufficient in quantity to increase the solubility of the lead compound in the electrolytic bath.

2. The process of claim 1 wherein said divalent lead compound is litharge.

3. The process of claim 1 wherein said electrolytic bath also contains a quantity of an agent tending to produce dense and coherent coatings, selected from a class consisting of alizarin and saponin.

4. An electrolytic bath for electrolytically refining lead comprising essentially an alkaline aqueous solution of a divalent lead compound and a polyhydric alcohol selected from a group consisting of glycerine and ethylene glycol sufficient to increase the solubility of said lead compound.

PAUL GOTTLIEB JULIUS GUETERBOCK.
ARTHUR EDWARD BAXTER.